TAPE REVERSAL MECHANISM

Filed Feb. 12, 1959 2 Sheets-Sheet 1

INVENTOR.
WILLIAM H. LYON
BY
H. G. Manning
ATTORNEY

INVENTOR.
WILLIAM H. LYON
BY
H. G. Manning
ATTORNEY

United States Patent Office 3,051,405

Patented Aug. 28, 1962

3,051,405

TAPE REVERSAL MECHANISM

William H. Lyon, Orange, Calif., assignor to The Soundscriber Corporation, New Haven, Conn.

Filed Feb. 12, 1959, Ser. No. 792,740

11 Claims. (Cl. 242—55.12)

This invention relates to magnetic tape recording equipment and is directed more particularly to mechanism for automatically reversing the direction of travel of a magnetic tape running between a pair of tape holding reels when it has reached an end position in a recording equipment of the type wherein the sound tracks are traced back and forth along spaced parallel tracks extending for substantially the full length of the tape.

The principal object of the invention is to provide a tape reversal mechanism of the above nature which is adaptable for use in a magazine-loading machine, wherein the tape and tape holding reels are mounted in a magazine separately removable from and replaceable in the recorder, and also in recording machines wherein the tape and tape holding reels are separately assembled.

A more particular object of the invention is to provide a tape reversal mechanism of the character described including a pair of electrical micoswitches having actuating arms in the form of a pair of bell-crank levers each carrying at one end a thin sensing wheel adapted to ride along the surface of the tape at each side of the transducer, said tape having slots located near each end in register with its respective wheel through which the wheel rim is adapted to extend to allow its bell-crank lever to actuate its microswitch, for actuating electrical means to reverse the direction of travel of the tape.

Another object of the invention is to provide a tape reversal mechanism of the above nature which will be simple in construction, easy to use, fool-proof in operatio and efficient and durable in use.

Other objects, features and advantages of the invention will be apparent from the following description when read with reference to the accompanying drawings.

In the drawings, wherein like reference numerals denote corresponding parts throughout the several views.

Figure 5:
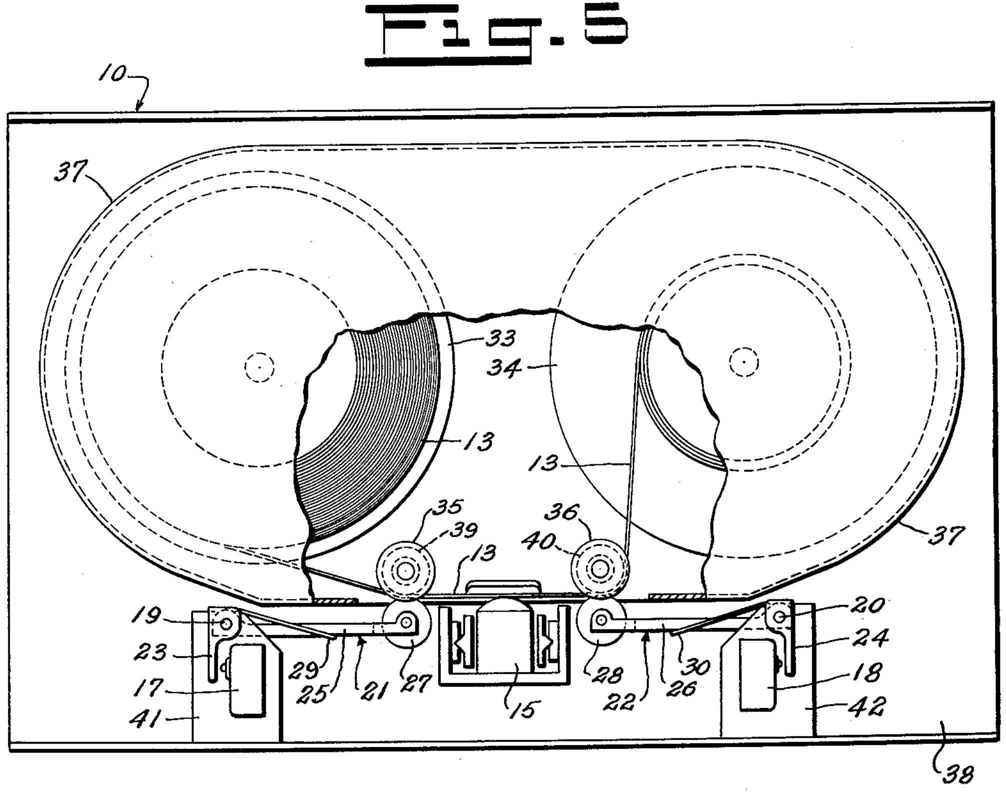
FIG. 5 is a plan view of a second form of the invention applied to a tape recording machine of the type wherein the tape holding reels and tape are arranged in a magazine which is removable and replaceable as a unit with respect to the recording machine.
Figure 7:
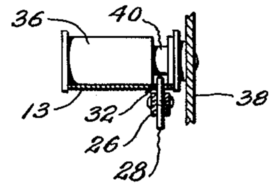
Figure 6:
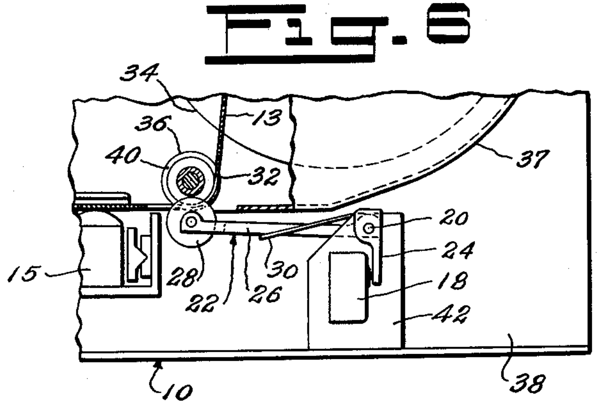

FIG. 6 is a partial plan view, similar to FIG. 5, showing the actuation of one of the bell-crank levers for reversing reel rotation and direction of tape travel when one end of the tape has been reached, and FIG. 7 is an elevational view of one of the tape guide rollers forming part of the second form of reversal mechanism showing the annular groove therein for receiving the corresponding bell-crank lever wheel rims for tape reversal.

Referring now in detail to the drawings, and considering first the embodiment of the invention illustrated in FIGS. 1 through 4, the same is shown applied to a magnetic tape recording machine 10 having tape-holding reels 11, 12, having an electric motor drive mechanism *11a* and *12a*, for winding the tape 13 back and forth therebetween while tracing spaced, parallel tracks running lengthwise along the tape to each end.

The tape 13 is threaded over a pair of spaced guide rollers 14 between which is arranged a recording and pick-up transducer 15. Means, forming no part of the invention and therefore not illustrated in detail herein, is provided for moving the transducer 15 laterally of the tape by short distances each time the tape direction is reversed, whereby the spaced parallel tracking will be effected.

Supported on a bracket 16 affixed to the chassis of the tape recording machine 10, and arranged in equidistantly-spaced relation with respect to the reels 11, 12, are a pair of microswitches 17, 18, one for each of said reels. Swingably journalled on pins 19, 20, upstanding from the bracket 16 are respective bell-crank levers 21, 22, having short arm portions 23, 24, positioned and adapted to contact at their outer ends the actuating buttons of their respective microswitches 17, 18, at certain positions of said bell-crank levers. The bell-crank levers 21, 22, also have long lever arm portions 25, 26, the ends of which have journalled thereon, thin wheels 27, 28 preferably of "nylon" for the purpose hereinafter appearing.

The bell-crank levers 21, 22, are fitted with tension springs 29, 30, respectively, urging them in the actuating direction with respect to their microswitches 17, 18, whereby the peripheral rims of the nylon wheels 27, 28, will be resiliently pressed into engagement with the outer surface of the tape on the reels 11, 12, respectively.

Figure 1:
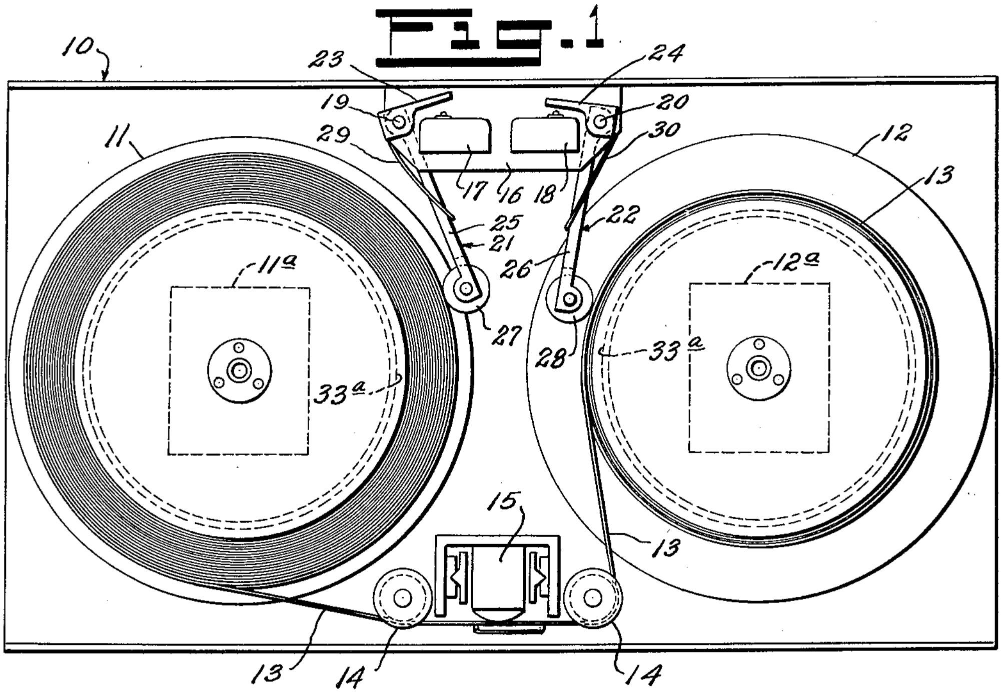
FIG. 1 is a plan view of one form of the invention applied to a tape recording machine of the type wherein the tape holding reels are separately mounted on the recording machine.
Figure 2:
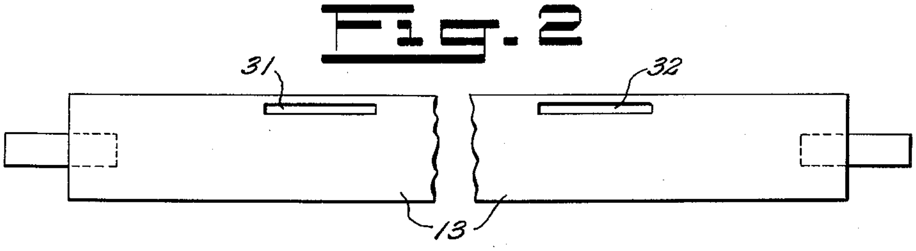
FIG. 2 is a plan view of the end portions of the magnetic tape, showing the slots therein.
Figure 3:
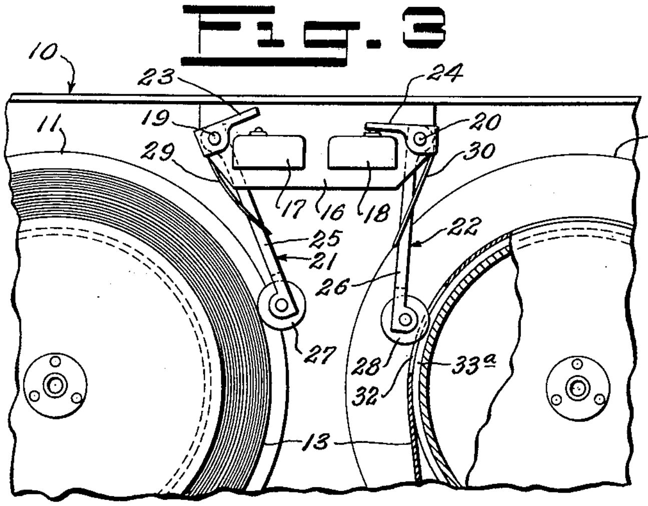
FIG. 3 is a partial plan view, similar to FIG. 1, and with portions broken away, showing the actuation of one of the bell-crank levers for reversing reel rotation and direction of tape travel when one end of the tape has been reached.
Figure 4:
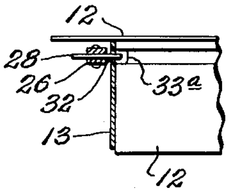
FIG. 4 is a partial vertical cross-sectional view of a tape reel, showing the annular groove in the hub thereof for receiving the wheel rim when extending through the slot at one end of the tape.

As illustrated in FIG. 2, the tape 13 is provided at each end with short slots 31, 32, which are in register with and wide enough to receive the rims of the respective nylon wheels 27, 28, when substantially all the tape 13 has been unreeled from one or the other of the tape holding reels 11, 12, to expose the corresponding slots in the tape. As best shown in FIGS. 3 and 4, the hub of each of the tape holding reels 11, 12, is formed with an annular groove 33*a* in register with the slots 31, 32, at the end of the tape 13, into which the corresponding wheel rim can fall when passing through a tape slot 31 or 32, to effect in the corresponding bell-crank lever (22 in FIG. 3) an abrupt inward movement operative to actuate the corresponding microswitch (17 or 18). The microswitches are connected in an electric circuit, of known design, and therefore not particularly described herein, operative to reverse the drive power, such as a motor, to the opposite tape holding reel for rereeling the tape 13 thereon and in the reverse direction. It will thus be apparent that each time the tape reaches an end position on one of the reels 11, 12, the direction of travel will be reversed, whereby the tape 13 will be continuously moved back and forth between the transducer 15 to substantially its full extent from end to end.

*Second Form*

The embodiment of the invention illustrated in FIGS. 5, 6, and 7, differs from that described above principally in that tape holding reels 33, 34, and guide rollers 35, 36, are arranged in a magazine housing 37 removable and replaceable as a unit on the recording machine chassis 38, said chassis being equipped with coupling mechanism for driving one or the other of said tape reels.

As illustrated in FIG. 5, the guide rollers 35, 36, when the magazine is in place, locate a portion of the tape 13 for passage across the transducer 15. In this embodiment of the invention, the guide rollers 35, 36, are provided with annular grooves 39, 40, respectively, in register with the slots 31, 32, of the tape 13, and are adapted to receive the rim portions of the respective nylon wheels 27, 28, for "sensing" the end portions of the tape. The microswitches 17, 18, and their associated bell-crank mechanisms are supported on separate brackets 41, 42, secured to the machine chassis 38. The operation of the second mechanism is similar to that described above in connection with the first embodiment of the invention illustrated in FIGS. 1 through 4.

While there have been disclosed in this specification two forms in which the invention may be embodied, it is to be understood that these forms are shown for the purpose of illustration only, and that the invention is not limited to the specific disclosures, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In tape recording and reproducing machines having reversible electric motor drive means, a tape reversal mechanism comprising, in combination, a pair of tape wheels driven by the electric motor drive means and having means forming circular recessions around their hubs in alignment with said tape slots, a pair of electrical switches connected to energize the reversible electric motor drive means, a resiliently urged lever extending from each of said switches to points adjacent the tape passing each of said tape wheels, and a sensing wheel on the end of each lever, said sensing wheels contacting said tape and aligned with the slots in said tape whereby one of said sensing wheels is suddenly urged into one of said tape slots and into one of said hub recessions to operate one of said switches, thereby reversing said reversible electric motor drive means.

2. In a recording machine for use with a tape having means forming a slot therethrough and having reversible drive means for moving the tape past a recording and replaying member, a tape reversal mechanism comprising, in combination, a pair of tape reels each having a recession in its hub in alignment with the tape slot means, switch means for reversing said drive means, a pair of resiliently urged levers operatively engaged with said switch means and adjacent the wound tape on said reels, and a wheel mounted on each of said levers, said wheels contacting the wound tape and aligned with said slot means whereby the edge of said wheel drops into the tape slot means and into said hub recession to effect sudden movement to one of said levers thereby actuating said switch means and reversing the drive means.

3. In a tape recording machine for use with a tape having means forming a slot therethrough and having reversible tape transport means, a tape reversal mechanism comprising, in combination, wheel means included in said tape transport means over which a tape is passed, means forming a groove on the surface of said wheel means in contact with said tape, and switching means including a sensing end portion resiliently urged against the tape and aligned with said groove, said switching means being connected to reverse the tape transport means when actuated.

4. Tape reversal mechanism as defined in claim 3 wherein said wheel means is a reel upon which the tape is wound and unwound.

5. Tape reversal mechanism as defined in claim 3 wherein said wheel means includes a tape guide wheel.

6. Tape reversal mechanism as defined in claim 3 wherein said sensing end portion includes a sensing wheel for contact with the tape.

7. In magnetic tape recording machines including tape transport means powered by a reversible electric motor drive means, a tape reversal mechanism comprising, in combination, a magnetic tape having means forming an opening therethrough, wheel means included in the tape transport means for holding and guiding said tape, means forming a depression under said tape in a wheel of said wheel means, a sensing lever having a sensing wheel at one end resiliently urged against said tape and positioned for engagement with said opening and said depression, switch means for reversing the drive means, said switch means being actuated by said sensing lever whereby engagement of said sensing means with the opening in said tape causes discrete rapid actuation of said switch means to reverse the direction of tape travel.

8. In a reversal mechanism for a magnetic tape recording machine having a pair of tape holding reels and electric drive motor means for winding the tape back and forth between the reels past a transducer for recording and reproducing intelligence along spaced parallel tracks thereon, the combination comprising, a pair of electrical switches for reversing the motor means, a pair of levers respectively connected to said switches, one end of each lever having journalled thereon a feeler sensing wheel, means for resiliently pressing the rims of said wheels against one side of the tape, one at each side of the transducer, rollers having annular grooves positioned at each side of the transducer, said grooves being aligned with said sensing wheels, slot means near each end of the tape and arranged in register with its respective sensing wheel for allowing passage of the corresponding wheel rim therethrough for effecting a discrete inward movement of the corresponding lever, each lever at its other end being arranged to actuate its respective switch upon the occurrence of said inward movement.

9. In tape recording machines having indicia on the tape and reversible drive means, a tape reversal mechanism comprising, in combination, tape reel means for retaining the tape in wound condition, said tape reel having means forming a depressed hub portion, and switch means for reversing the drive means, said switch means including a sensing element co-operatively aligned with indicia on the tape, said sensing element including a wheel positioned to ride upon the tape in alignment with the depression in said reel hub portion.

10. In tape recording machines having indicia on the tape and reversible drive means, a tape reversal mechanism comprising, in combination, tape reel means for retaining the tape in wound condition, and switch means for reversing the drive means, said switch means including a sensing wheel co-operatively aligned with indicia on the tape, a tape guide wheel having a depressed hub portion below the tape, whereby said switch means reverses the drive means when movement of the tape brings the indicia into register with said sensing wheel and said depressed portion on said guide wheel hub.

11. In a recording machine for use with a recording tape having slot means formed therethrough and having reversible tape transport means for guiding and moving a tape relative to recording means, a tape reversal mechanism comprising, in combination, switch means for operating the transport means, the transport means including a guide wheel having means forming a groove beneath the tape, a lever connected to actuate said switch means, and sensing means on said lever biased toward said tape in alignment with the tape slot means for sensing movement into said groove through said slot means, actuating said switch means, whereby said switch means is actuated upon juxtaposition of the tape slot means with said sensing means, thus effecting reversal of said tape through the transport means.

References Cited in the file of this patent

UNITED STATES PATENTS

| | | |
|---|---|---|
| 1,789,607 | Steurer | Jan. 20, 1931 |
| 2,069,595 | Thomas | Feb. 2, 1937 |
| 2,595,545 | Rose et al. | May 6, 1952 |
| 2,754,605 | Berkeley | July 17, 1956 |